Dec. 6, 1960 E. J. ROSS ET AL 2,963,566
CONTROL DEVICES
Filed Oct. 14, 1958 5 Sheets-Sheet 1

Dec. 6, 1960  E. J. ROSS ET AL  2,963,566
CONTROL DEVICES
Filed Oct. 14, 1958  5 Sheets-Sheet 2
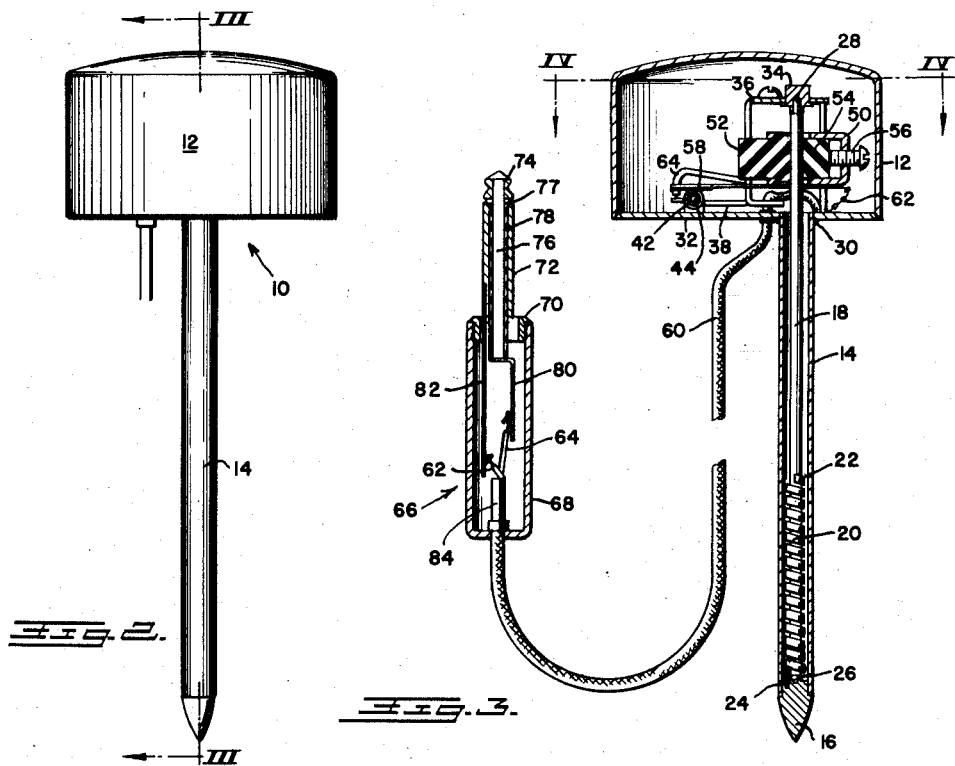
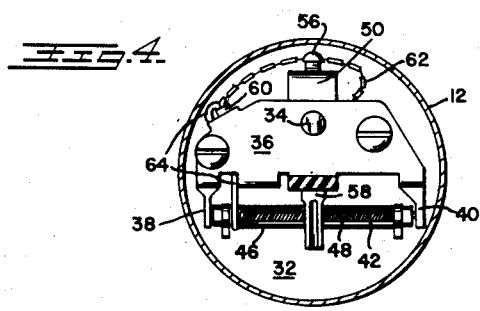

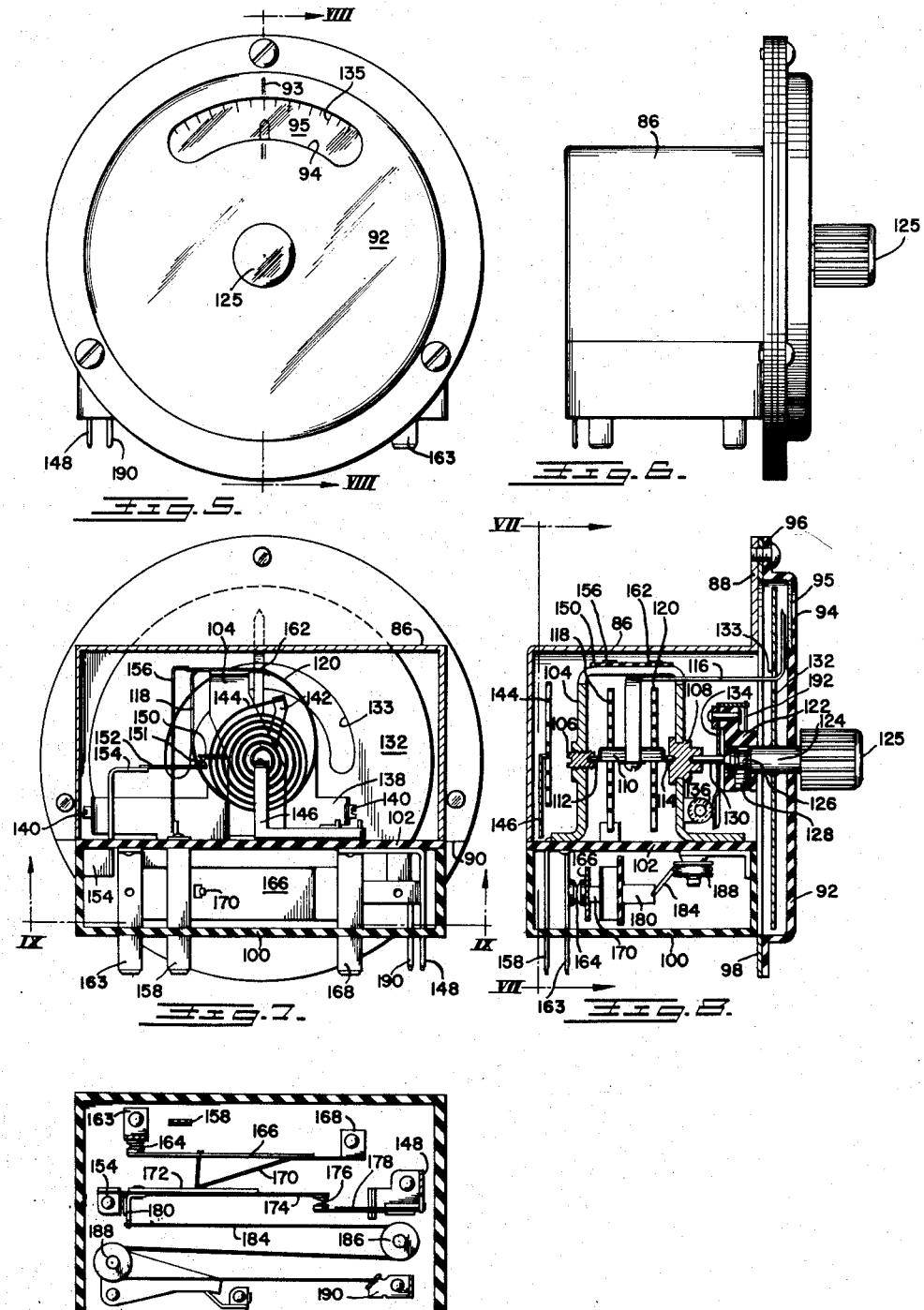

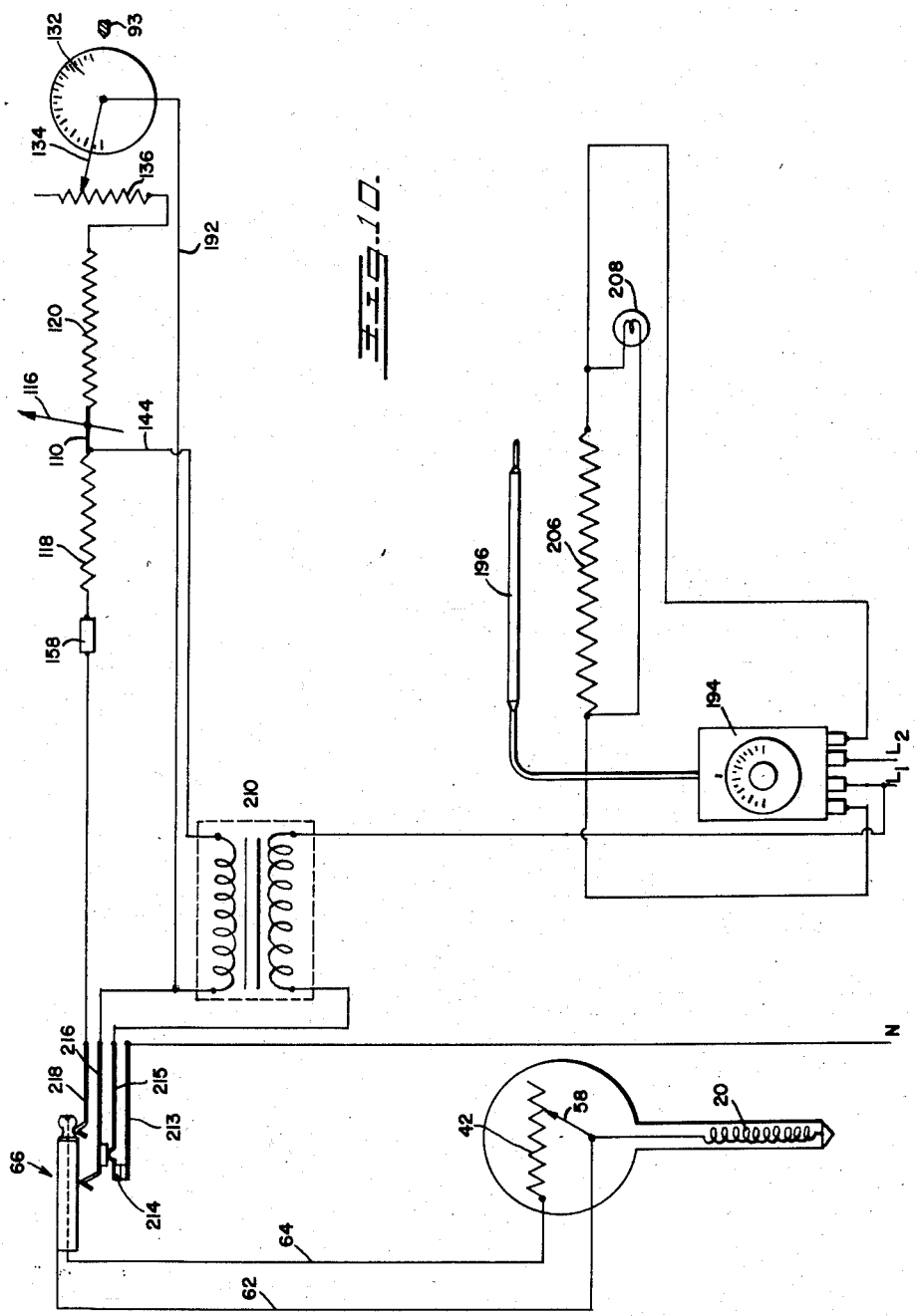

United States Patent Office 2,963,566
Patented Dec. 6, 1960

2,963,566

CONTROL DEVICES

Edward J. Ross, McKeesport, and Charles D. Branson, Greensburg, Pa., assignors to Robertshaw-Fulton Controls Company, Richmond, Va., a corporation of Delaware Filed Oct. 14, 1958, Ser. No. 767,234

5 Claims. (Cl. 219—20)

This invention relates to control devices for heating appliances and more particularly to devices responsive to the internal temperature of a material, such as meat, being heated or cooked by the appliances.

It is a general object of this invention to control the heating of a material within the appliance in accordance with the internal temperature thereof.

Another object of this invention is to indicate the internal temperature of the material during the heating operation.

Another object of this invention is to automatically shut off the heating device when the internal temperature of the material reaches the desired temperature.

A further object of this invention is to prevent the heating means from being turned on with resultant overcooking or overheating of the material after the heating means has been shut off.

Briefly stated, in a preferred embodiment of this invention, a temperature responsive means adapted to be inserted into the material being heated, is provided having a temperature sensitive element which controls the effective resistance of a variable resistor in proportion to the internal temperature of the material. Movement of a first biasing means, connected in series with the effective resistance, is opposed by second biasing means, controlled by an adjustable resistor, in a circuit parallel to the first. This movement actuates an indicator and relay means which at a point of balance of the biasing means, indicates the temperature of the material and shuts off the heating means. The relay means further prevents the heating means from being energized after the material cools.

Other objects and advantages of this invention will become apparent from the following description and drawings wherein:

Fig. 2 is a front view of an element shown in Fig. 1;

Fig. 3 is a cross-section along line III—III of Fig. 2;

Fig. 4 is a cross-section along line IV—IV of Fig. 3;

Fig. 5 is a front view of another element shown in Fig. 1;

Fig. 6 is a side view of the element of Fig. 5;

Fig. 7 is a cross-section along line VII—VII of Fig. 5;

Fig. 8 is a cross-section along line VIII—VIII of Fig. 5;

Fig. 9 is a cross-section along line IX—IX of Fig. 7;

Fig. 10 is a schematic view of a modification of this invention; and

Figure 1:
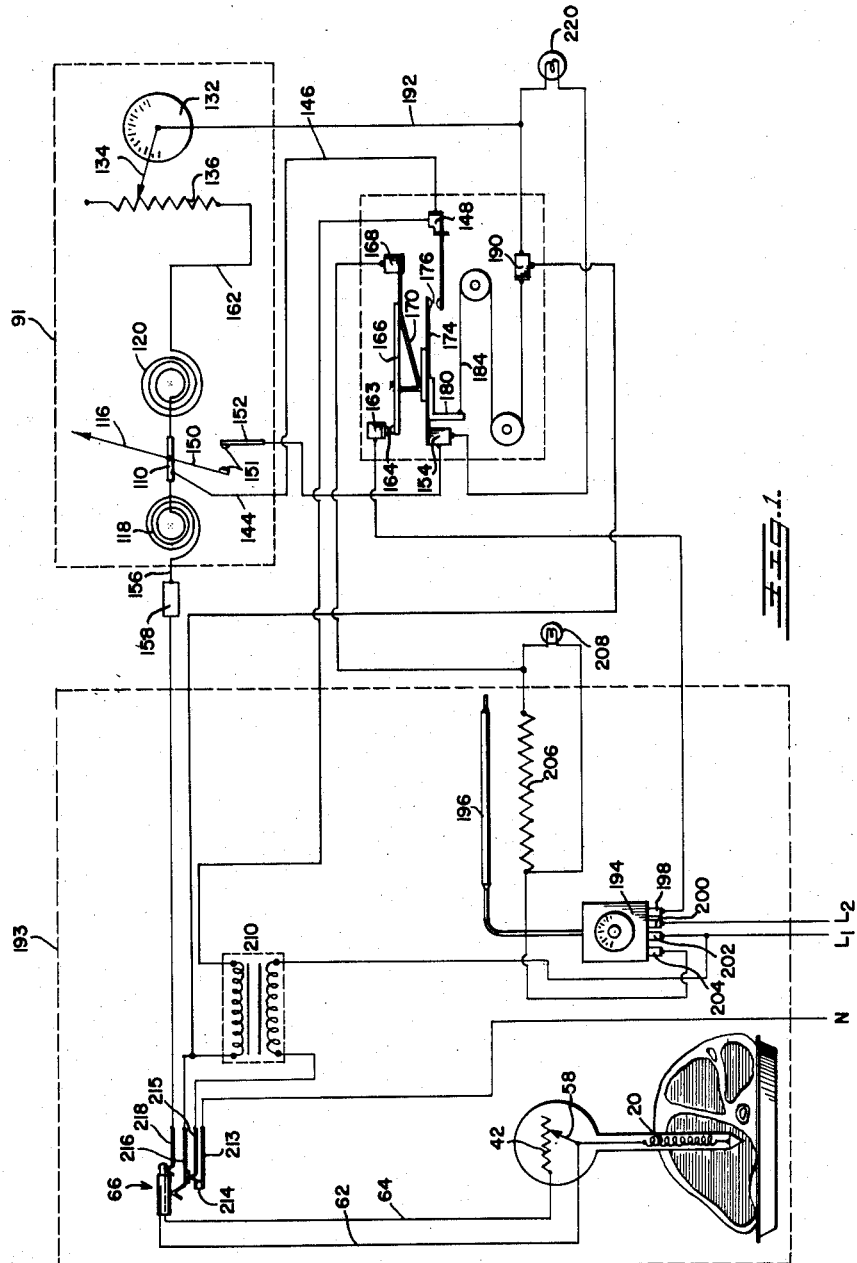
Fig. 1 is a schematic view of an embodiment of this invention.

A temperature responsive means 10, shown in Figs. 2, 3, and 4, has a housing 12 formed to enclose the control elements thereof. A meat probe tube 14, preferably formed of a material such as stainless steel which will not react with the material into which the tube is inserted, has a skewer point 16 attached to the lower end thereof. A temperature sensitive element comprising a helically wound bimetal 20 is disposed within tube 14 in close proximity to the lower walls thereof so that bimetal 20 will be at approximately the same temperature as the adjacent walls of tube 14. Bimetal 20 has one end 24 secured to skewer point 16 to thereby hold it stationary. A rod 18, having journal ends 26 and 28 thereon, is attached to an end 22 of bimetal 20 whereby changes in the temperature of the walls of tube 14 adjacent bimetal 20 causes it to expand and contract in response thereto in such a manner that end 22 and rod 18 rotate. The upper surface of skewer 16 has a bearing portion which rotatably supports journal 26 and rod 18.

Housing 12, formed with generally cylindrical side walls and a cap over one end thereof, has a bottom plate 32 secured thereto formed with an aperture 30 which is adapted to receive the upper end of tube 14 welded to the walls of aperture 30. A bearing 34 rotatably receives end 28 and is attached to a bracket 36 which is in turn connected by screws to a portion of bottom plate 32. Bracket 36 has support arms 38 and 40 extending therefrom to support a resistor 42 within housing 12. Variable resistor 42, composed of a helical wire wound about an insulating core 44 and covered with an insulating sleeve 46, is held stationary with respect to the housing by arms 38 and 40. An elongated aperture 48 in sleeve 46 permits access to resistor 42 from above.

Secured to the upper end of rod 18 is a clamp 50 which comprises a generally U-shaped member having holes in the side walls thereof through which rod 18 is adapted to pass. The rod does not, however, contact bracket 50 but is connected thereto by an insulating block 54 pressing rod 18 against a T-shaped insulating block 52 which extends between the legs of the U-shaped bracket and is held in place by the T-ends engaging the holes through the side walls of the bracket 50. A screw adjusting means 56 presses insulating block 54 against rod 18 and thereby secures the bracket to rod 18 for rotation therewith. An electrically conducting wiper arm 58 is connected to the underside of bracket 50 and extends from the bracket outwardly into movable engagement with resistor 42 in such a manner that rotation of rod 18 causes wiper arm 58 to move back and forth over resistor 42. Because of the insulating blocks 52 and 54, wiper arm 58 is electrically insulated from shaft 18 and from the other sections of housing 12. A cable 60 passes through bottom plate 32 and has a strand 62 connected to wiper arm 58 and another strand 64 connected to one end of wire wound resistor 42.

By sealing the aperture through which cable 60 extends into housing 12, the unit is fluid-tight and may be washed by immersion in a cleansing fluid. The other end of cable 60 is connected to a conventional jack 66, which comprises a tubular handle 68 having a plug 70 mounted in one end thereof. Handle 68 is formed of electrical insulation material. Connected to plug 70 and integral therewith is a conducting sleeve 72 disposed around an insulating sleeve 78 through which a conducting rod 76 extends and is connected at one end to a contact 74. Between contact 74 and sleeve 72, a insulating washer 77 is placed to separate these elements. Connected to the other end of rod 76 is a conducting bar 80 which, in turn, is connected to strand 64. Sleeve 72 has a conducting bar 82 connected thereto which is connected to strand 62. Cable 60 extends through handle 68 and is held in place by a supporting sleeve 84.

It will be readily apparent that with these connections, an electrical circuit is established through thermally responsive device 10. This circuit has in series contact 74, rod 76, bar 80, strand 64, a variable portion of wire wound resistor 42, wiper arm 58, wire 62, bar 82, and sleeve 72. This circuit provides a variable effective resistance responsive to the temperature of bimetal 20, which upon changes in temperature, rotates rod 18 and wiper arm 58 to change the amount of resistance of wire wound resistor 42.

As shown in Figs. 5 through 8, a four-sided cubical housing 86 has a generally C-shaped flange 88 extending about a portion of a periphery of one side thereof which flange terminates at 90. A cover plate 92 with an index 93 formed thereon, has an annular flange 96 extending about the periphery thereof, and an arcuate opening 94 in which a glass window 95 is mounted. Flange 96 and flange 88 are attached to each other by screw means and have a washer 98 disposed therebetween. A housing 100 is covered by a top 102 and is conencted to housing 86 to form a unitary structure. Both housing 100 and top 102 are formed of electrical insulation material.

Enclosed within the unitary housing structure and connected thereto is a bracket 104. A threaded hole through one of the legs of bracket 104 is adapted to receive an adjustable bearing 106, whereas a hole in the opposite leg of bracket 104 has a fixed bearing 108 secured therein. Extending between these two bearings is a rotatable shaft 110 having a journal pin 112 supported by bearing 106 and a journal pin 114 supported by bearing 108. Secured to shaft 110 for rotation therewith is an indicator 116 which extends upwardly from the shaft and has a pointer on the opposite end thereof which can be seen through window 95 from the front of the casing. Shaft 110 is rotated or pivoted by helical bimetals 118 and 120 in a manner hereinafter disclosed.

A support member 122 formed of electrically nonconductive material, has a hole therethrough adapted to receive a rotatable shaft 124 disposed therein. An adjustable screw means 128 coacts with an annular groove 126 of shaft 124 to secure support 122 thereto. A knob 125 is secured to one end of shaft 124 and is adapted to manually rotate shaft 124. A journal pin 130 is secured to the other end of shaft 124 and is supported by a bearing 108. Welded to shaft 124 is an indicator plate 132 having indicia 135 which indicates temperature or degree of rarity of a roast. An arcuate hole 133 in plate 132 permits indicator 116 to pass therethrough and to be freely rotatable therein.

A wiper arm 134 is also connected to support member 122 and has one portion thereof extending downwardly to engage an adjustable resistor 136. Thus, rotation of knob 125 to align indicia 135 with index 93 causes wiper arm 134 to engage resistor 136 at a point dependent upon the setting of the indicating means. Resistor 136 is supported by arms 138 of bracket 104 and is held in place by screw means 140.

An arm 142 is connected at one end to shaft 110 and has the other end thereof connected to a spiral conducting spring 144 which is connected to a conducting strip 146. This strip is in turn connected to a terminal 148 which extends through the lower portion of the casing 100. This arrangement provides an electrical connection between shaft 110 and terminal 148.

Also connected to shaft 110 for rotation therewith are switch means comprising a contract arm 150 which cooperates through contacts 151 with a stationary contact arm 152 which is in turn connected to a bracket 154. Contact arms 150 and 152 are adapted to be engaged when bimetals 118 and 120 reach a balanced condition.

One end of bimetal 118 is connected to shaft 110 and the other end is connected to a conducting bracket 156 which is in turn connected to a terminal 158. Bracket 156 holds one end of the bimetal stationary so that upon expansion and contraction of bimetal 118, the shaft will rotate. Likewise, the stationary end of bimetal 120 is connected to a conducting bracket 162 which is in turn connected, by means not shown, to one end of adjustable resistor 136. Bimetals 118 and 120 are oppositely wound and current flowing therethrough causes expansion of one to be opposed, through shaft 110, by the other. The proximity and opposition of both bimetals renders the systems immune to extraneous forces from such effects as line voltage and ambient temperature variations which will be cancelled by each bimetal being affected equally.

A hot wire relay is arranged in the casing comprising a contact arm 166 associated with a terminal 163 through contacts 164. An end of contact arm 166 is connected to a flexible spring 170, in turn connected at one end to a terminal 168. Flexible spring 170 has the other end thereof bent partially backwards to extend through an aperture in contact arm 166. A small lip on the end of flexible spring 170 limits movement thereof in one direction through the hole in contact arm 166. A contact arm 174, having one end thereof connected to a terminal 154, has a strip of insulation 172 mounted thereon which contacts flexible spring 170. Contact arm 174 is flexible and pivots or bends about a terminal 154. A stationary contact arm 178 has contact arm 174 and contacts 176 associated therewith. An L-shaped member 180 is connected to contact arm 174 and has a leg thereof connected to a hot wire 184 which extends around bearing insulators 186 and 188 to a stationary terminal 190.

As shown in Fig. 9, current passing through hot wire 184 will cause it to expand. Since one end thereof is fixed to terminal 190 and the other end is connected to member 180, this expansion through the bias of flexible spring 170 causes contact arm 174 to move in a clockwise direction whereupon contacts 176 will close. At this point, contact arm 166 and flexible spring 170 rotate counterclockwise and thereby open contacts 164, which are normally closed when the hot wire 184 has no current flowing therethrough.

It is understood that the manner of interconnecting the current carrying members and the various moving parts of this invention into their respective circuits hereinafter described is well known in the art and that many various arrangements thereof may be made by conventional methods.

Shown in Fig. 1 is a schematic view of a system embodying this invention and comprises an oven or heating device 193 having a conventional thermostat 194 for controlling a heater 206. A temperature sensing element 196 is disposed within oven 193 and is used to actuate thermostat 194 to maintain a preselected desired temperature within the oven. An indicating light 208 is connected in parallel with heating element 206 to indicate whenever current is flowing through that element.

Preliminary to the heating, the roast is placed in the oven and the meat probe is inserted into the center of the roast. Jack 66 is connected into a conventional receiving device causing contact arm 216 to close contacts 214 carried by contact arms 213 and 215 to complete a circuit between the power lines L1 and N through thermostat 194 and the primary of transformer 210. At this point, knob 125 is rotated until index 93 and indicia 135 correspond to the desired temperature at which the meat will be done. This rotation causes wiper arm 134 to rest at a point on resistor 136 corresponding to the desired shut off resistance.

The system is now ready for operation and by turning thermostat 194 to the desired oven temperature, current will flow through a heating circuit from L1 to terminal 202, through thermostat 194, terminal 204, heater 206 to terminal 168, contact arm 166, contacts 164, terminal 163, terminal 198, thermostat 194 and terminal 200 to L2. With current flowing through heater 206, indicator light 208, in parallel therewith, lights up.

A second circuit is also established beginning at L1 through the primary of transformer 210, contact arm 215, contacts 214, contact arm 213, and back to N. This second circuit forms the energizing means for the control circuits wherein power is taken off of the secondary of transformer 210.

Concurrently, a temperature responsive circuit is established from one side of the secondary through contact arm 216, sleeve 72 of jack 66, strand 62, wiper arm 58, resistor 42, strand 64, through the center of arm 58, resistor 42, strand 64, through the center of jack 66, contact 218, terminal 158, support 156, bimetal 118, shaft 110, bracket 142, spring 144, bracket 146, terminal 148 and back to the other side of the secondary of the transformer 210.

Also concurrently, a balancing circuit is established from one side of the secondary to terminal 190, through bracket 192, wiper arm 134, resistor 136, bracket 162, bimetal 120, shaft 110, arm 142, spring 144, bracket 146, and terminal 148 back to the other side of the secondary.

With the balancing circuit and the temperature sensing circuit energized, it will be seen that they are in parallel and that bimetal 118 is in series with variable resistor 42, and bimetal 120 is in series with adjustable resistor 136. The initial current flowing through both bimetals 118 and 120 causes them to expand but since they are in opposition to each other, they will rotate shaft 110 and indicator 116 to an initially balanced position. Wiper arm 58 is arranged so that when placed in the meat, resistor 42 will have a larger resistance than that of resistor 136; consequently, the current flowing through bimetal 120 will be greater than the current flowing through bimetal 118.

During the heating operation, thermostat 194 controls the temperature of the inside of the oven independent of the controls circuits which are regulated by the internal temperature of the roast. As this temperature increases, bimetal 20 will expand causing wiper arm 58 to decrease the effective resistance of resistor 42. Because resistor 136 is set at a fixed value, the gradual decreasing of resistance 42 will cause an increasing amount of current to flow through bimetal 118 which expands thereby rotating shaft 110 and contact arm 150. Contacts 151 are so arranged that they will close when bimetals 118 and 120 have achieved the balanced position which corresponds to the temperature at which the meat will be done, as indicated by the indicia 135 and index 93. At the point of closing, indicator 116 will be aligned with index 93 and will indicate the true temperature of the roast. Since the position of indicator 116 and index 93 is determined by the amount of opposition existing between bimetals 118 and 120, indicator 116 will not indicate the true temperature directly until they are aligned. But, dependent upon the setting of the indicating plate, any difference between index 93 and indicator 116 can be interpreted to give the true internal temperature of the meat.

At this point of balance, contacts 151 close and establish a switching circuit which comprises from one side of secondary transformer 210 to terminal 190, through hot wire 184, member 180, terminal 154, contact arm 152, contacts 151, contact arm 150, shaft 110, bracket 142, spiral spring 144, bracket 146 and terminal 148 back to the other side of the secondary. With current flowing through hot wire 184, it expands causing flexible contact arm 174 to pivot clockwise due to the bias of spring 170. This in turn causes contact arm 166 to pivot counterclockwise thereby opening contacts 164 to shut off the power through main heating element 206.

Concurrently, contacts 176 close and a hold circuit is established which beginning at one side of the secondary, is through terminal 190, hot wire 184, member 180, contact arm 174, contacts 176 and terminal 148 back to the other side of the secondary. Current flowing through hot wire 184 maintains contacts 176 in a closed position and prevents contacts 164 from being closed whereupon the heating circuit would be turned on.

When contacts 151 initially close upon reaching a balanced condition, the indicator light 220, or other indicating means such as an audible alarm, is placed in parallel with hot wire 184 across terminals 154 and 190. This indicator serves to notify the cook that the roast has reached the desired temperature and that the oven has been turned off.

Once the heat has been turned off, the roast may gradually cool whereupon the gradually increasing resistance of resistor 42 creates an unbalanced condition between bimetals 118 and 120 causing contacts 151 to subsequently open. However, because the hot wire has expanded and contacts 176 are closed, contacts 164 will be unable to close and hence no power will be delivered to heater 206. This prevents the meat from being recooked or overdone.

The hold circuit is broken by either removing jack 66 from its corresponding receptacle or by turning thermostat 194 to an "off" position. The latter is preferred because without jack 66 plugged into the system, the oven will act in a normal manner. By merely removing jack 66, the heater will be placed under the control of thermostat 194. In this case, when the oven has cooled sufficiently, removing jack 66 causes the heating circuit to be energized to return the oven to the temperature set by thermostat 194. Thus, the preferred method of breaking the holding circuit is to turn thermostat 194 to an "off" position.

As previously indicated, removal of jack 66 will cause thermostat 194 to control the oven in the normal manner. In this case, a circuit would be established through the heating element as before but contacts 164 will not open in response to the control circuit.

As shown in Fig. 10, a slight modification of this invention will result in a heating system having an indicator or indicating device which would notify the cook that the meat has reached the desired temperature but which will not automatically turn off the heating element in response to this predetermined temperature. By eliminating much of the hot wire relay means, one side of the secondary can be connected directly to conductor 192. This, in effect, cuts out the shut off control circuit for heater 206, the holding circuit and switching circuit through the hot wire relay. In this system, the energizing circuit for the primary of the transformer is the same as before. And the method by which the system is turned on is the same. The heating circuit now comprises L1 through thermostat 194, heater 206, and thermostat 194 to L2. In this arrangement, the "on-off" control of heater 206 is determined by temperature sensing element 196 connected to thermostat 194. Indicator light 208 in parallel with heater 206 indicates when current is flowing through the heater. As the internal temperature of the roast increases, the indicater 116 approaches index 93. Upon alignment, the meat is at the desired temperature as shown by indicia 135 and it is necessary to manually shut off the system by turning off thermostat 194.

Figure 11:
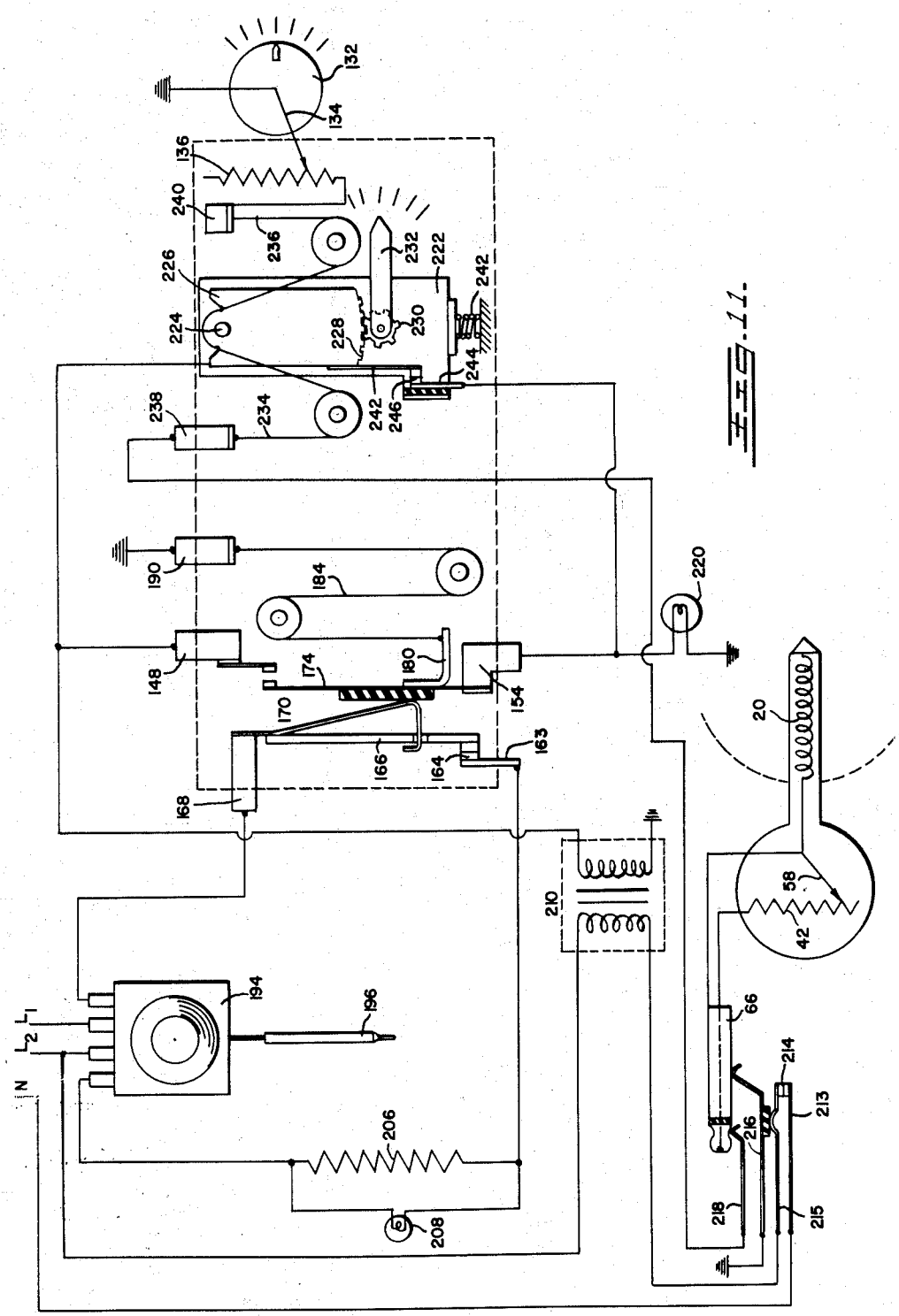
Fig. 11 is a schematic view of another embodiment of this invention.

In the embodiment shown in Fig. 11, a bracket 222 is movably mounted on the casing and has a pivot pin 224 extending therefrom on which a pivotal control member 226 is mounted. The control member 226 is formed with a rack 228 which cooperates with a pinion 230 to move an indicator needle 232 in response to movement of control member 226 caused by expansion and contraction of hot wires 234 and 236. Hot wire 234 is connected at one end to fixed terminal 238, and is connected at the other end to control member 226 at a point radially displaced from pivot pin 224. Similarly, hot wire 236 is connected to fixed terminal 240 and to control member 226 at a point opposed to the connection of hot wire 234. A helical spring 242 biases bracket 222 to create tension in hot wires 234 and 236 which opposes the biasing force. Current flowing through hot wires 234 and 236 causes expansion thereof, and if the current is the same through both wires, the expansion is equal and control member 226 will assume the position shown in Fig. 11. But if the current in one of the wires is greater than that in the other, the unequal length thereof allows control member 226 to pivot about pin 224 because of the biasing force. A switch arm 242 is carried by control member 226 for rotation therewith and cooperates with a terminal 244 through contacts 246. When the current flowing through both wires is equal, the contacts 246 are closed.

The operation of this embodiment is similar to that of the previously described embodiment. When the device is initially placed into operation in the same manner as before, the resistance 42 will have a higher value than that of rheostat 136 whereupon current flowing from the secondary of transformer 210 will have a greater value in hot wire 236 than in hot wire 234. Consequently, the control member 226 will be rotated, counterclockwise as shown in Fig. 11, to a position wherein contacts 246 are open. As the temperature of the meat increases and the resistance 42 decreases, the current flowing through hot wire 234 increases causing it to expand whereupon biasing spring 242 will move bracket 222 slightly causing control member 226 to rotate in a clockwise direction. When the temperature of the meat reaches that degree as set by rheostat 136, the current flowing through both wires is equal and contacts 246 will be closed. A switching circuit is thereby established through hot wire 184 which causes contacts 176 to close in the manner previously described whereupon a hold circuit is established.

Although the invention is described in relation to a domestic oven for cooking food, it will be understood that it is applicable in some of its aspects to other heating devices such as for example, commercial ovens for heat treating various articles or substances.

It is understood that many changes may be made in the combination and arrangement of parts and the details of construction within the scope of the appended claims without departing from the invention disclosed herein.

We claim:

1. In a system for heating material in an enclosed chamber, the combination comprising a movable member, an arm secured substantially at its midpoint to an intermediate portion of said movable member, one end portion of said arm being an indicator, contacts mounted on the oppositely disposed end portion of said arm, a first expansible element mounted on one end of said movable member for rotating said movable member in one direction when electrically energized, a second expansible element disposed on the opposite end of said movable member for rotating said movable member in the opposite direction when electrically energized, a first control system connected in series circuit with said first expansible element, said first control system being adapted for determining the internal temperature of material being heated in the chamber, a second control system connected in series circuit with said second expansible element and being adapted to be adjusted for the maximum desired temperature of the material to be heated, said first and second expansible elements being connected in parallel circuit relationship with a common conductor connected to said movable member, said movable member being rotatable in direct proportion to the current passing through said first and second elements, and a third control system including energizing means adapted for heating the material, said contact on said arm deenergizing said third control system when the proportion of current passing through said first and second elements approaches unity.

2. In a system for heating material, the combination comprising a movable member rotatable about an axis, an arm secured to the intermediate portion of said movable member, a contact at the free end of said arm, a pair of counteracting expansible elements secured at opposite ends of said movable member, a first control system adapted for determining the internal temperature of a material, said first control system being electrically connected to one of said expansible elements, a second control system electrically connected to said second expansible element, said counteracting expansible elements being in parallel circuit relationship, and a third control system for energizing heating means, said second control system being energized to bias its counteracting element to rotate said movable member, said first control system being variably energized in proportion to the internal temperature of a material to bias its counteracting element to oppositely rotate said movable member, said contact on said arm deenergizing said third control system when the electrical energy in said first and second control systems is equal.

3. In a system for heating material, the combination comprising a first control system adapted to be variably energized in proportion to the temperature of the material to be heated, a second control system energized by substantially constant electrical energy, a third control system energized when the electrical energy in said first and second control systems is equal, a fourth control system being adapted for supplying heat to the material, said third control system being relay means normally biased for energizing said fourth control system, separate contacts arranged to be closed when said third control system is actuated to open said relay means, and conductor means for biasing said separate contacts to the open position, said conductor means relaxing when current passes therethrough to close said separate contacts and simultaneously open the relay means of the third control system to deenergize the fourth control system to thereby terminate the first-heat supply to the material.

4. In a system for heating material, the combination comprising a first control system adapted to be variably energized in proportion to the internal temperature of the material to be heated, a second control system energized by substantially constant electrical energy, a third control system energized when the electrical energy in said first and second control systems is substantially equal, a fourth control system adapted for supplying heat to said material, said third control system being relay means having first and second spaced flexible arms supported diametrically from each other, contact means on the free ends of each of said arms, resilient means normally biasing said second arm to the closed position, and conductor means secured to said second arm for biasing its contact to the open position, said conductor means also biasing said first arm through said second arm and said resilient means to close said contacts on said first arm, said conductor means being in the electrical circuit of said third control system whereby when said third control system is energized said conductor means is relaxed for closing the second arm contacts and opening the first arm contacts to deenergize the fourth control system.

5. In a system for heating material, the combination comprising a first control system adapted to be variably energized in proportion to the internal temperature of the material to be heated, a second control system energized by substantially constant electrical energy, a third control system adapted for supplying heat to the material, a movable member pivotable about an axis, a contact for deenergizing the third control system in its closed position located at the free end of said movable member, and counteracting hot wire members electrically connected to said first and second control systems and secured to opposite sides of said movable member adjacent its pivoted end, said second control system being energized to relax its hot wire member to rotate said movable member about its pivot to disengage the contact on said movable member, said first control system being variably energized to relax its counteracting hot wire to oppositely rotate said movable member, said contact on said movable member in the closed position being operable to deenergize said third control system when the electrical energy in said first and second control systems is substantially equal.

References Cited in the file of this patent

UNITED STATES PATENTS

| | | |
|---|---|---|
| 1,289,617 | Berry | Dec. 31, 1918 |
| 1,528,053 | Hands | Mar. 3, 1925 |
| 1,606,858 | Wilhjelm | Nov. 16, 1926 |
| 2,624,824 | Daiger | Jan. 6, 1953 |
| 2,820,130 | Dadson | Jan. 14, 1958 |
| 2,877,333 | Long et al. | Mar. 10, 1959 |